United States Patent
Puma

(10) Patent No.: US 7,149,498 B2
(45) Date of Patent: Dec. 12, 2006

(54) DETECTING USABLE FREQUENCY CHANNELS BY EXPLOITING COMPLEX POLYPHASE FILTER OPERATION

(75) Inventor: Giuseppe Li Puma, Bochum (DE)

(73) Assignee: Infineon Technologies AG, Munich (DE)

( * ) Notice: Subject to any disclaimer, the term of this patent is extended or adjusted under 35 U.S.C. 154(b) by 411 days.

(21) Appl. No.: 10/829,665

(22) Filed: Apr. 22, 2004

(65) Prior Publication Data

US 2005/0009487 A1    Jan. 13, 2005

(30) Foreign Application Priority Data

Apr. 22, 2003   (DE) .................. 103 18 188

(51) Int. Cl.
*H04B 1/16*  (2006.01)
*H04B 1/04*  (2006.01)
*H04B 1/10*  (2006.01)

(52) U.S. Cl. .................. 455/336; 455/115.3; 455/218; 455/225

(58) Field of Classification Search ............... 455/221, 455/218, 212, 275, 323, 334, 336, 337, 115.3; 375/350, 345, 259, 219, 316–318

See application file for complete search history.

(56) References Cited

U.S. PATENT DOCUMENTS

| 6,148,048 A * | 11/2000 | Kerth et al. ................ 375/350 |
| 6,397,050 B1 * | 5/2002 | Peterson et al. ............ 455/221 |
| 2004/0152436 A1 * | 8/2004 | Masenten et al. ........... 455/323 |

FOREIGN PATENT DOCUMENTS

WO   WO 01/48909   7/2001

* cited by examiner

*Primary Examiner*—Tony T. Nguyen
(74) *Attorney, Agent, or Firm*—Eschweiler & Associates, LLC

(57) ABSTRACT

A circuit arrangement for detecting a usable frequency channel includes first and second devices for performing frequency conversion. The first and second frequency conversion devices have respective local oscillator inputs to which respective local oscillator signals are applied. The local oscillator signals are at a common frequency and have a phase difference of precisely 90°. A complex polyphase filter has first and second filter inputs connected to respective outputs of the first and second frequency conversion devices. A detection arrangement is connected to outputs of the complex polyphase filter in order to detect a signal level. A further arrangement can vary the phase angle of a signal output from at least one of the frequency conversion devices.

20 Claims, 2 Drawing Sheets

DETECTING USABLE FREQUENCY CHANNELS BY EXPLOITING COMPLEX POLYPHASE FILTER OPERATION

FIELD OF THE INVENTION

The invention relates generally to frequency channel detection and, more particularly, to detection of a free frequency channel.

BACKGROUND OF THE INVENTION

Some mobile radio standards use the TDMA method (Time Division Multiple Access) in order to transmit data. In this case, the two stations each transmit and receive alternately. In order to improve the immunity to interference sources, the mobile radio standards additionally use a so-called FHSS method (Frequency Hopping Spread Spectrum), in which they change the frequency after each transmitted or received packet. One example of a mobile radio standard such as this is Bluetooth, which has a channel bandwidth of 1 MHz and has a total of 79 channels available in the free frequency range that is used from 2.4 to 2.485 GHz. The time in which transmission or reception takes place, a so-called time slot, has a length of at least 625 μs, although data is transmitted or received for only 405 μs. The remaining time can be used to change to the new frequency.

Since the Bluetooth standard is operated in the unlicensed 2.4 GHz ISM frequency band, it is necessary to use the FHSS method that has been mentioned in order to make it possible to compensate for interference caused on a channel by the random frequency changes. As the free ISM frequency range is used to an increasing extent, interference in individual channels is becoming more frequent, however, so that the probability of finding a channel that has already been used after a frequency hop is rapidly rising. This is primarily a result of the new mobile radio standards 802.11b and 802.11g. These use a frequency bandwidth of about 20 MHz, which can lead to interference in a number of the channels that are used by Bluetooth. For this reason, so-called adaptive frequency hopping (AFH) has been developed as a further development, which allows Bluetooth appliances to reduce the number of channels used and to use the number of usable channels selectively.

However, to do this, a statement is required on the quality of each individual one of the 79 channels in order then to make it possible to make a selection of the usable channels. The statement on the quality is produced with the aid of an RSSI measurement (Receive Signal Strength Indicator), which indicates the signal strength in the measured frequency channel at the time of the measurement. There are a number of possible ways to carry out a measurement such as this.

One concept provides for RSSI measurements to be carried out rather than normal data transmission in the unused channels during the time slots. During a measurement such as this, it is necessary for no useful data to be transmitted in the measured channels during the measurement. However, a method such as this considerably reduces the available data rate while at the same time increasing the power consumption, since the oscillator and the phase-locked loop always have to pass through an initial transient process to a new channel.

One alternative concept is to use the 220 μs that has been mentioned at the end of each time slot. No useful data is transmitted during this time, so that an RSSI measurement can be carried out in another channel without having to take account of any useful data stream that may be present. However, the time which is available for the initial transient process for the phase locked loop when switching to a new channel, for the RSSI measurement and the renewed initial transient process for switching to a further channel for transmitting or receiving useful data is in this case very short. This leads to considerably increased power consumption and to a more complex, and thus more expensive, phase locked loop.

An object of the invention is therefore to provide a simple circuit arrangement as well as a method for quality measurement in a frequency channel.

SUMMARY OF THE INVENTION

A circuit arrangement is provided which has first and second devices for frequency conversion, each having an input, a local oscillator input and an output. Local oscillator signals are applied to the local oscillator input, with the local oscillator signals at the respective local oscillator inputs being at the same frequency, and having a phase difference of precisely 90°.

Furthermore, the circuit arrangement has a complex channel filter arrangement which has a polyphase filter with a first input of the polyphase filter being connected to the output of the one frequency-converting device, and a second input of the polyphase filter being connected to the output of the other frequency-converting device. Furthermore, an arrangement for detection of a signal level is connected to the outputs of the complex channel filter.

Finally, an arrangement is provided to vary the phase angle of a signal at the output of at least one of the frequency-converting devices. This makes it possible to use the frequency and phase selectivity of the complex channel filter device for detection of a free frequency channel. In some embodiments this arrangement has the capability to vary the phase angle through a multiple of 90° in the positive or negative direction.

One advantageous development of the invention comprises a switching arrangement which can interchange the connections of the respective inputs of the polyphase filter to the respective outputs of the frequency-converting devices. The two signals coming from the frequency-converting devices are in this way interchanged, which corresponds to the two signals being shifted through +90° and −90°, respectively.

An alternative development of the invention provides a switching arrangement which can interchange the connections of the respective local oscillator signals to the respective local oscillator inputs.

Yet another refinement of the invention is distinguished by a switching arrangement in which the imaginary component of the local oscillator signal can be inverted. This results in the imaginary component being shifted through 180°.

The two complex signal components at the outputs of the frequency-converting devices have a phase difference of 90°. The phase angle of at least one signal component is varied by interchanging the two components, or by inverting one component. An RSSI measurement is carried out in an adjacent frequency channel by the subsequent complex channel filtering and the measurement of the signal strength in the signal paths.

This is done without the phase locked loop or the oscillator having to carry out an initial transient process to switch to a new frequency. This avoids greater complexity as well as an increase in cost resulting from high-quality components.

If the useful signal in one frequency channel k is converted to an intermediate frequency, with the intermediate frequency being n-times the channel bandwidth, then one development of the method according to the invention is distinguished by setting to the mid-frequency in the channel k. The two signal paths are then interchanged, and the RSSI measurement is carried out in the k±n-th frequency channel, advantageously after the end of useful signal transmission in the frequency channel k.

The invention thus allows the signal strength of a channel that has been shifted by the intermediate frequency to be determined in a simple manner without any need for the oscillator and the phase locked loop to carry out an initial transient process once again.

As described above, exemplary embodiments include first and second devices for frequency conversion, each having a local oscillator input and a local oscillator output. Respective local oscillator signals at the local oscillator inputs are at the same frequency and have a phase difference of precisely 90°. A complex channel filter is connected to the outputs of the first and second frequency-converting devices, and an arrangement for detection of a signal level is connected to the outputs of the complex channel filter.

BRIEF DESCRIPTION OF THE DRAWINGS

The invention will be explained in detail in the following text using exemplary embodiments and with reference to the figures.

In the figures.

DETAILED DESCRIPTION

Figure 1:
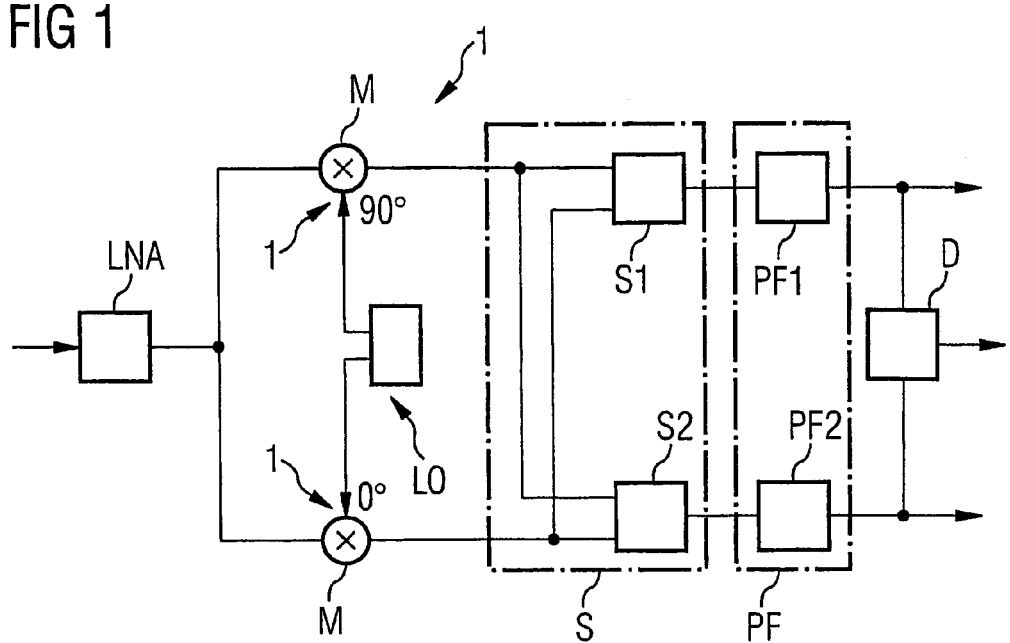
FIG. 1 shows a first exemplary embodiment of the invention.

Reference Symbols in the Drawings Are:
(LNA):Reception amplifier
(LO): Local oscillator
(M): Frequency-converting device
(F): Block filter
(A): Amplifier
(PF): Complex channel filter
(PF1,PF2): Polyphase filter
(L): Limiter
(D): Detection device
(S): Switching means
(S1,S2): Switch
($f_{LO}$): Local oscillator frequency
($f_{RF1}, f_{RF2}$): Reception frequency
($f_{z1}, f_{z2}$): Intermediate frequency
(TR): Received signal
(Rx): Received data
(BS): Range switching
(MS): Measurement
(RT): Overall duration
($T_{RSS1}$):Measurement time The first exemplary embodiment in FIG. 1 shows an input amplifier LNA, in which the received signal is amplified and is then supplied to the two mixers M. The mixers have a balanced configuration and each have a local oscillator input 1, to which a local oscillator signal is applied. These signals are at the same frequency, but have a phase difference of 90°. The two signals are produced by a local oscillator LO.

The outputs of the mixers M represent the I path and the Q path, and are also referred to as the real path and the imaginary path. They lead to a switching arrangement S, which has two switches S1 and S2. The two local oscillator outputs are in this case each connected to one input of the respective switches S1 and S2. The switches S1 and S2 are switched such that the two signals coming from the mixers are always produced at their outputs. In other words, the different complex signal elements can always be tapped off at the output of the switching arrangement S, but are never the same.

The outputs of the switching arrangement S lead to a complex channel filter PF, which has two arrangements PF1 and PF2. These are part of a complex polyphase filter. The outputs of the complex channel filter PF are connected to a detection device D, which measures the signal level of the outputs, and emits a signal in order to make a quality statement for the measured frequency channel.

The outputs of the complex channel filter PF also lead to a demodulation device (not shown).

A received signal is amplified by the reception amplifier LNA and is then passed to the two mixers M, which break down the received signal into its complex components at an intermediate frequency IF. This process is referred to as IQ demodulation and can be described mathematically by a real component and an imaginary component at the intermediate frequency IF $e^{j\omega_{IF}t}=\cos(\omega_{IF}t)+j\sin(\omega_{IF}t)$. The two complex components are produced during the frequency conversion process by the two local oscillator signals, which have a phase shift of 90°. The component shifted through 90° in this case produces the imaginary component of the input signal, after conversion.

Figure 3:
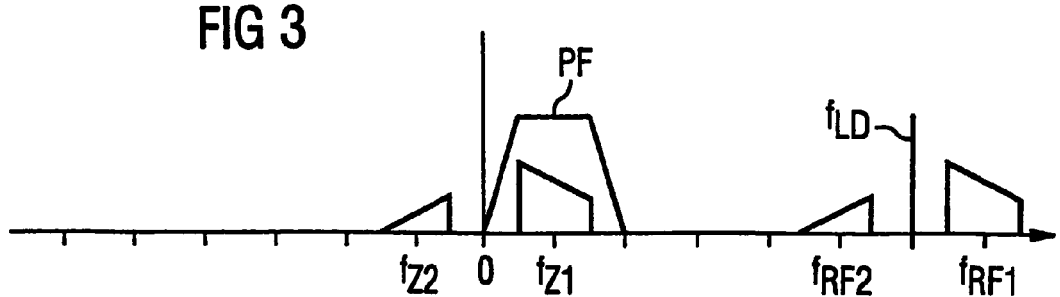
FIG. 3 shows a frequency spectrum for more detailed explanation.

The complex frequency conversion to the intermediate frequency IF is shown by way of example in FIG. 3. The received signal has a mid-frequency $f_{RF1}$ and is shifted from an adjacent channel with the mid-frequency $f_{RF2}$ by the amount $2*(f_{LO}-f_{RF1})$ which is equivalent to $2*f_{IF}$. In the rest of the description, the expression mid-frequency is equated to the expression frequency channel.

The frequency channel $f_{RF1}$ is converted to the intermediate frequency $f_{z1}$ via the local oscillator signal at the frequency $f_{LO}$ in accordance with the following conversion: $f_{z1}=f_{RF1}-f_{LO}$. At the same time, the adjacent channel $f_{RF2}$ is converted by the oscillator signal $f_{LO}$ to the negative intermediate frequency $f_{Z2}$.

The complex channel filter PF suppresses the intermediate frequency FZ2, so that a signal in the adjacent channel FRF2 does not impede further demodulation. In contrast to a real channel filter, a complex polyphase filter can filter selectively, that is to say it can suppress the positive or negative frequency. It is thus frequency-selective, or else phase-selective.

If the real part and the imaginary part at the input of the polyphase filter are now interchanged, then this can be described mathematically by: $je^{-j\omega_{IF}t}=j(\cos(\omega_{IF}t)-j\sin(\omega_{IF}t))$. This process is equivalent to a shift through 90° in the positive direction for the real part at one input, at 90° in the negative direction for the imaginary part at the other input.

The frequency-converted channels $f_{Z1}$ and $f_{Z2}$ are thus interchanged in the frequency spectrum shown in FIG. 3. The complex channel filter therefore now suppresses the frequency-converted signal $f_{Z1}$ in the original input channel $f_{RF1}$. The previously suppressed converted signal $f_{Z2}$ in the adjacent channel $f_{Rf2}$ is passed without being filtered to the output of the complex channel filter, where it is measured. An RSSI measurement in an adjacent channel is thus carried out by interchanging the real and imaginary components.

Figure 4:
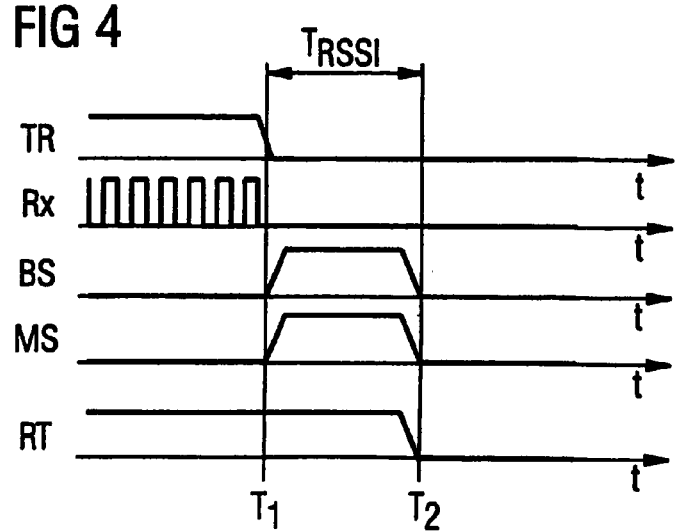
FIG. 4 shows the time profile of an RSSI measurement during a time slot.

FIG. 4 explains the timing for a measurement such as this. Until the time T1, a received signal TR is applied to the circuit arrangement according to the invention, comprising the received data RX. At the time T1, when the useful data stream ends, range switching BS takes place to the adjacent channel. The RSSI measurement is carried out between the times T1 and T2.

The reception module RT is switched off after the time T2, in order that the phase locked loop and the oscillator can carry out an initial transient process to switch to a new frequency. The measurement of the signal strength in an adjacent channel may be carried out both in the time of the reception slot and in the time of a transmission slot. The adjacent reception area, in which the measurement is carried out, is separated from the actual useful data channel, in which data is previously transmitted or received, by the amount 2* the intermediate frequency $f_{IF}$.

If the intermediate frequency is n-times the channel bandwidth, then an RSSI measurement is always carried out in a further frequency channel using this method. Since the channel bandwidth in the Bluetooth mobile radio standard is 1 MHz, it is in this case worthwhile likewise using 1 MHz as the intermediate frequency $f_{IF}$ to which the received signal is converted, so that the mirror band is located two channels either higher or lower, depending on the LO frequency.

The signal detector D is in the form of a level detector, which compares the signal strength of the measured frequency channel with a reference value, and then produces a statement relating to the quality of the channel. The comparison with a reference value may also be carried out in a later phase, so that the detection device stores the measured value in a table.

The channels may thus be stored and a quality map produced, on the basis of which the adaptive frequency hopping algorithm uses the usable channels. Furthermore an RSSI measurement may be carried out after each data transmission without having to interrupt the communication between the transmitter and the receiver in order to measure the channel quality. This allows individual channels to be assessed continuously, so that the "quality map" can be updated continuously. In particular, it is possible to detect interference sources that are not continuous in time, such as 802.11b transmitters. Channels which at one time have been classified as being busy or poor can be measured again without any interruption in ongoing data communication. Very efficient adaptive frequency hopping algorithms can be produced in conjunction with the evaluation of the channel that is set before the time of the RSSI measurement.

There are various possible ways to interchange the two signal paths, which are then supplied to the inputs of the arrangements PF1 and PF2 of the polyphase filter, in order to carry out the RSSI measurement.

Figure 2:
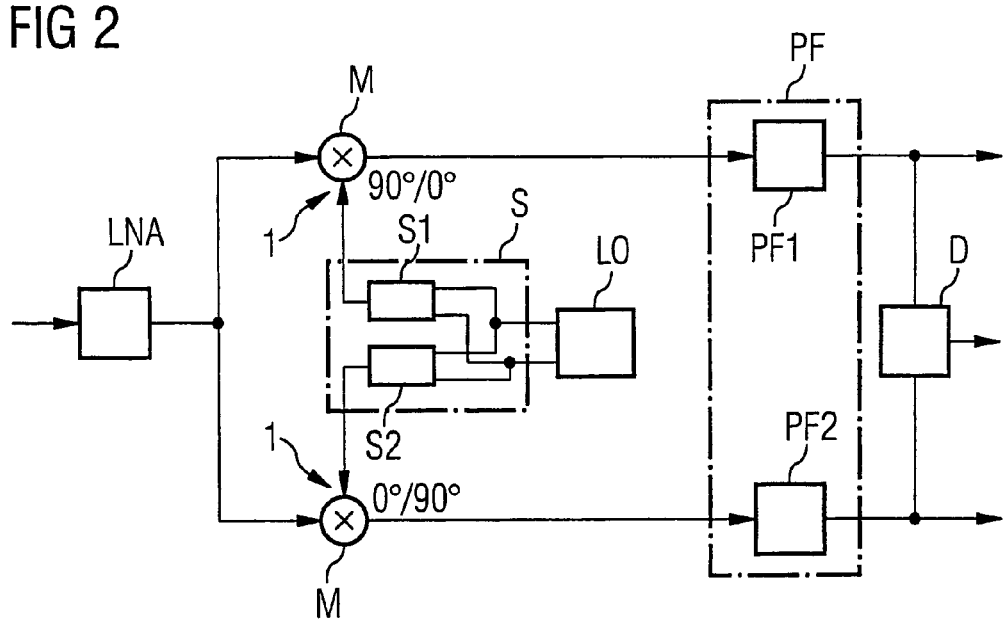
FIG. 2 shows a second exemplary embodiment of the invention.

One alternative refinement of the invention is shown in FIG. 2, in which local oscillator inputs are interchanged rather than the components of the frequency-converted useful signal. The same reference symbols are in this case used for the same components. The local oscillator inputs 1 of the mixers M in this case come from a switching arrangement S, which has the two switches S1 and S2. The switching arrangement S interchanges the real and complex local oscillator signals, so that interchanged intermediate frequency signals are likewise applied to the inputs of the complex channel filter PF after frequency conversion.

Mathematically, such interchanging is equivalent to the illustration in FIG. 1. In this case as well, the signal detection device D is used to make statements about the quality of a channel.

A further alternative of the invention is the provision of a switching arrangement which inverts the imaginary component I of the local oscillator signal, that is to say it shifts it through 180°. The imaginary component is in general the component shifted through 90°. Inversion of the imaginary components leads to interchanging of the mathematical sign of the sine function of the mathematical description of the signal. This is likewise evident in the frequency spectrum in the interchanging of the two intermediate frequencies, and thus allows the mirror frequency channel to be measured in a circuit such as this.

Figure 5:
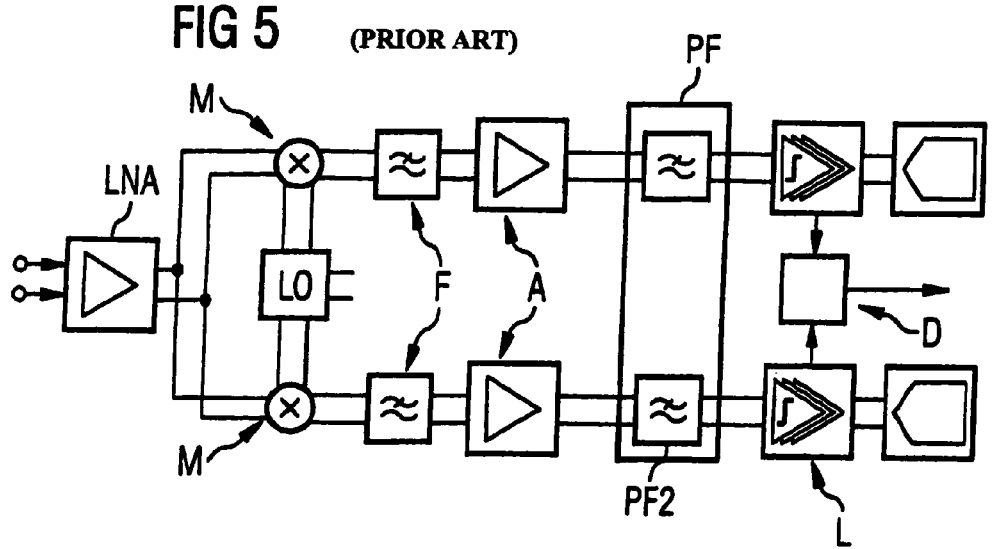
FIG. 5 shows a block diagram of a known mobile radio receiver.

It will be evident to workers in the art that exemplary embodiments of the invention can be readily implemented by suitably modifying known mobile radio receivers of so-called low-IF architecture, such as illustrated by way of example in FIG. 5. In addition to a reception amplifier LNA, this also has two mixers M, the complex channel filter PF as well as the detection device D. In addition, the known arrangement also has further filters F and amplifiers A, which are used to improve the signal quality of the converted complex signal elements. The apparatuses L and ADC carry out the rest of the data processing.

The invention is not restricted to the Bluetooth standard but in principle can be used for any TDMA or TDD Standard. The circuit according to the invention as shown in FIG. 1 and FIG. 2 can also be extended with elements of the known mobile radio receiver shown in FIG. 5, for example with the blocking filters F or the analog/digital converters ADC in order, by way of example, to make it possible to use amplitude modulation methods such as QPSK or QAM.

The invention can thus provide for the real and imaginary signal paths to be interchanged before the complex channel filter, in order to make it possible to measure the signal strength of an unused channel, with a suitably chosen intermediate frequency.

Although exemplary embodiments of the invention are described above in detail, this does not limit the scope of the invention, which can be practiced in a variety of embodiments

What is claimed is:

1. An apparatus for detection of a frequency channel, comprising:
    first and second devices for performing frequency conversion, each of the first and second frequency conversion devices having an input and an output, the first and second frequency conversion devices having respective first and second local oscillator inputs for respectively receiving first and second local oscillator signals, wherein the local oscillator signals are at a common local oscillator frequency and have a phase difference therebetween of precisely 90°;
    a complex polyphase filter with first and second filter inputs connected to the outputs of the first and second frequency conversion devices, respectively, the polyphase filter including a plurality of filter outputs;
    means connected to the filter outputs for detecting a signal strength; and means for varying a phase angle of a signal at the output of at least one of the first and second frequency conversion devices.

2. The apparatus of claim 1, wherein the varying means is for varying the phase angle by a multiple of 90° in one of a positive direction and a negative direction.

3. The apparatus of claim 2, wherein the varying means, the detecting means and the complex polyphase filter are cooperable for permitting RSSI measurement without changing the local oscillator frequency.

4. The apparatus of claim 2, wherein the detecting means includes a level detector which compares a signal level at the filter outputs to a reference signal level.

5. The apparatus of claim 1, wherein the varying means includes a switching means for connecting the first and second filter inputs to the outputs of the second and first frequency conversion devices, respectively.

6. The apparatus of claim 5, wherein the varying means, the detecting means and the complex polyphase filter are cooperable for permitting RSSI measurement without changing the local oscillator frequency.

7. The apparatus of claim 5, wherein the detecting means includes a level detector which compares a signal level at the filter outputs to a reference signal level.

8. The apparatus of claim 1, wherein the varying means includes a switching means for applying the first and second local oscillator signals to the second and first local oscillator inputs, respectively.

9. The apparatus of claim 8, wherein the varying means, the detecting means and the complex polyphase filter are cooperable for permitting RSSI measurement without changing the local oscillator frequency.

10. The apparatus of claim 8, wherein the detecting means includes a level detector which compares a signal level at the filter outputs to a reference signal level.

11. The apparatus of claim 1, wherein the first and second local oscillator signals are real and imaginary components, respectively, of a local oscillator output, and wherein the varying means includes means for inverting the second local oscillator signal.

12. The apparatus of claim 11, wherein the varying means, the detecting means and the complex polyphase filter are cooperable for permitting RSSI measurement without changing the local oscillator frequency.

13. The apparatus of claim 11, wherein the detecting means includes a level detector which compares a signal level at the filter outputs to a reference signal level.

14. The apparatus of claim 1, wherein the detecting means includes a level detector which compares a signal level at the filter outputs to a reference signal level.

15. The apparatus of claim 14, wherein the varying means, the detecting means and the complex polyphase filter are cooperable for permitting RSSI measurement without changing the local oscillator frequency.

16. The apparatus of claim 1, wherein the varying means, the detecting means and the complex polyphase filter are cooperable for permitting RSSI measurement without changing the local oscillator frequency.

17. A method of detecting a free frequency channel among at least two frequency channels which have a common channel bandwidth, comprising:
performing complex conversion on an input signal in one of the frequency channels to produce a complex signal having two signal components at an intermediate frequency which is an integer multiple of the common channel bandwidth;
interchanging the two signal components of the complex signal;
measuring a signal strength associated with a complex channel-filtered version of the interchanged signal components; and
comparing the measured signal strength to a reference signal strength.

18. The method of claim 17, including executing said performing, interchanging and measuring steps in a period of time other than during transmission of a useful communication signal.

19. The method of claim 18, including executing said performing, interchanging and measuring steps after each of a plurality of useful communication signal transmissions, and storing the measured signal strengths to produce a quality map that is updated to include another measured signal strength after each of the useful communication signal transmissions.

20. The method of claim 17, including executing said performing, interchanging and measuring steps after each of a plurality of useful communication signal transmissions, and storing the measured signal strengths to produce a quality map that is updated to include another measured signal strength after each of the useful communication signal transmissions.

* * * * *